United States Patent [19]
Fenner

[11] Patent Number: 5,559,519
[45] Date of Patent: Sep. 24, 1996

[54] METHOD AND SYSTEM FOR THE SEQUENTIAL ADAPTIVE DETERMINISTIC CALIBRATION OF ACTIVE PHASED ARRAYS

[75] Inventor: David K. Fenner, Columbia, Md.

[73] Assignee: Northrop Grumman Corporation, Los Angeles, Calif.

[21] Appl. No.: 434,810

[22] Filed: May 4, 1995

[51] Int. Cl.$^6$ .................................................... G01S 7/40
[52] U.S. Cl. .......................... 342/174; 342/157; 342/376; 342/377; 342/203
[58] Field of Search .............................. 342/174, 54, 157, 342/158, 159, 372, 375, 376, 377, 203

[56] References Cited

U.S. PATENT DOCUMENTS

| | | | |
|---|---|---|---|
| 4,517,570 | 5/1985 | Gray, Jr. | 342/372 |
| 4,520,361 | 5/1985 | Frazita | 342/372 |
| 4,791,421 | 12/1988 | Morse et al. | 342/368 |
| 5,111,208 | 5/1992 | Lopez | 342/174 |
| 5,353,033 | 10/1994 | Newberg et al. | 342/375 |

Primary Examiner—John B. Sotomayor

[57] ABSTRACT

Apparatus for calibrating a phased array antenna having a plurality of active modules and a test manifold. An RF antenna, which is both a transmitting and receiving antenna is positioned at a far field range from the antenna to be calibrated. A receiver is connected to the output of the far field receiving antenna and the output of the test manifold of the antenna to be calibrated for the transmit calibration and a transmitter is connected to the far field transmitting antenna and the test manifold for a receive calibration, a command phase and amplitude for each steering angle of each module of the antenna being calibrated. The phase and amplitude data from the test manifold is compared with the phase and amplitude data of the far field range to obtain an error signal, and the error signal is combined with the command amplitude and phase iteratively until the error signal is minimized for each module of the antenna.

15 Claims, 12 Drawing Sheets

TRANSMIT CALIBRATION
SEND DATA THROUGH TRANSMIT MANIFOLD

RECEIVE ON EXTERNAL SOURCE
DATA FROM INDIVIDUAL MODULES

RECEIVE ON TEST MANIFOLD
DATA FROM INDIVIDUAL MODULES

RECEIVE CALIBRATION
COLLECT DATA THROUGH RECEIVE MANIFOLD

TRANSMIT ON EXTERNAL SOURCE
DATA FROM INDIVIDUAL MODULES

TRANSMIT ON TEST MANIFOLD
DATA FROM INDIVIDUAL MODULES

METHOD AND SYSTEM FOR THE SEQUENTIAL ADAPTIVE DETERMINISTIC CALIBRATION OF ACTIVE PHASED ARRAYS

BACKGROUND OF THE INVENTION

1. Field of the Invention

The present invention relates to active phased array antennas; and more particularly, to the calibration of the active phased arrays.

2. Description of Related Art

An active phased array antenna is an array of elements that are switched between transmit and receive channels. The plurality of the individual elements are commonly connected to form a transmit/receive module. In the transmit mode a power amplifier activates each module; and in the receive mode, a low noise amplifier amplifies the incoming signal. The array of modules is steered by varying the phase and amplitude of the elements. Current active phased array antennas typically distribute the radar transmit and receive channels among multiple transmit/receive (T/R) modules. These modules require phase and amplitude control not only for steering, but also, to adjust for their own mutual differences and to compensate for any residual errors in the radiators. Since the modules are considerably more active in an active phased array when compared with prior systems employing phase shifters alone, they are prone to drifts in amplitude and phase; and must be continually re-tuned after initial range calibration. Several techniques have been proposed to re-tune the array. As far as is known, they all involve setting up a calibration loop around the T/R modules. A coupler at the output of each module is then attached to a test manifold. One system proposes utilizing a near field source on the wing of an airborne radar, or external to a ground radar. Still another system proposes injecting signals at the individual radiators.

Current range calibration techniques use a far field source to measure the antenna pattern at each angle off bore sight for a given pointing angle. Heretofore, it was proposed that the algorithms to re-tune the module would be derived from such current range calibration techniques. Since the implied amplitude and phase taper can be found from a fast Fourier transform of the pattern, corrections can then be applied to each module. This method is iterative and must be done for each beam position. Although noise side lobes at the −25 dBi level have been attained, the results have been inconsistent and the pattern tends to degrade quickly.

It was also proposed that the modules could be re-tuned in-flight or on the ground by measuring the antenna pattern derived from a self-contained test manifold. The pattern would be generated by phase steering the modules to each pointing angle. The FFT of this pattern would then give an implied amplitude and phase taper across the array similar to the current ground testing. However, unlike the current ground testing which takes a separate pattern for each pointing angle; this process would only produce one pattern for all pointing angles. However, with this pseudo-pattern, it is necessary to exercise the modules over many phase and amplitude settings in order to point to each pointing angle. Thus, the question arises as to which module setting should be corrected. This problem, of course, did not exist in the current ground testing because each commanded setting at each pointing angle was tuned individually. Therefore, this test manifold pattern information could restore the array patterns at each angle only if the module drift was linear across the phase and amplitude characteristics of each module. Unfortunately, the drift is not linear because the actual transfer curves of the modules change with time.

Thus, there is a need for a calibration system and method that overcomes the limitations of the proposed methods and systems as outlined above.

SUMMARY OF THE INVENTION

The present invention is directed to a method and system for calibrating active phased arrays that overcomes the problems and disadvantages of the related systems.

Additional objects and advantages of the invention will be set forth in part in the description which follows and in part will be obvious from the description, or may be learned by practice of the invention. The objects and advantages of the invention may be realized and attained by means of the instrumentalities and communications particularly pointed out in the appended claims.

To achieve the objects and in accordance with the purpose of the invention, as embodied and broadly described herein, the invention is an apparatus for calibrating a phased array antenna having a plurality of active modules and a test manifold, including an RF antenna for positioning at a far field range from the antenna to be calibrated. The far field RF antenna is a receiving antenna for a transmit calibration and a radiating antenna for a receive calibration. A receiver has an input connected to the output of the far field receiving antenna and an input connected to the output of the test manifold of the antenna to be calibrated for the transmit calibration. A transmitter has an output connected to an input of the far field transmitting antenna, and has an output connected to an input of the test manifold for a receive calibration. The apparatus includes means for determining a command phase and amplitude for each steering angle of each module of the antenna being calibrated; means for comparing the phase and amplitude data from the test manifold with the phase and amplitude data of the far field range to obtain an error signal; and means for combining the error signal with the command amplitude and phase iteratively until the error signal is minimized for each module of the antenna.

In another aspect, the present invention is a method of calibrating a phased array antenna having a plurality of active modules and a test manifold that includes the steps of collecting, for each module of the array in sequence, first phase and amplitude data of radar pulses applied to a receiver from a far field range; collecting, for each module of the array in sequence, second phase and amplitude data of said radar pulses applied to a receiver from the test manifold; determining a command phase and amplitude for each steering angle of each module; comparing the phase and amplitude data from the test manifold with the phase and amplitude data from the far field range to obtain an error signal; and combining the error signal with the command amplitude and phase iteratively until the error signal is minimized.

The accompanying drawings, which are incorporated in and constitute a part of this specification, illustrate one embodiment of the invention and together with the description serve to explain the principles of the invention.

DESCRIPTION OF THE PREFERRED EMBODIMENT

Reference will now be made in detail to the present preferred embodiment of the invention, an example of which is illustrated in the accompanying drawings.

Figure 1:
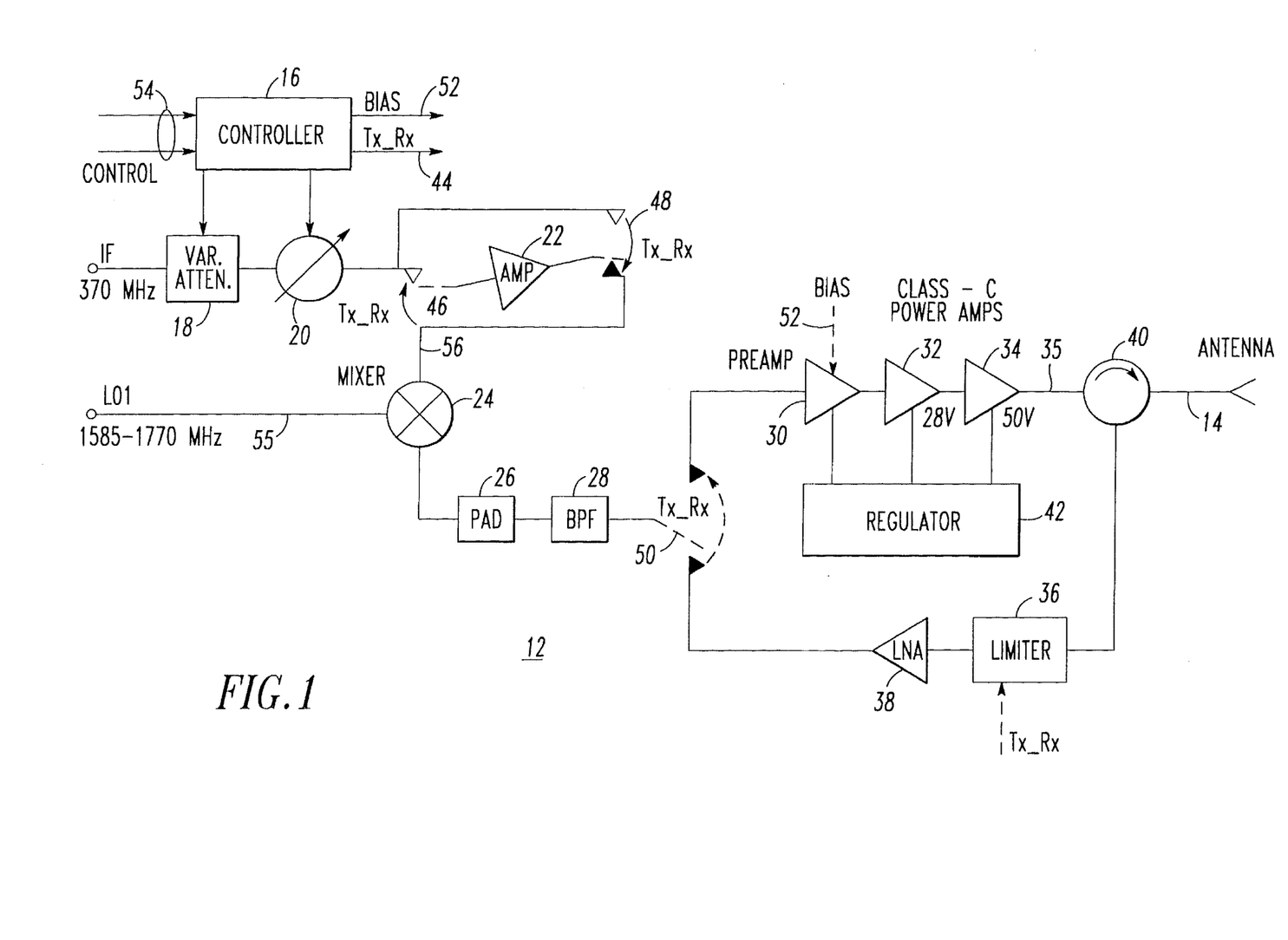
FIG. 1 is a schematic block diagram of a module configured for calibration in accordance with the present invention.

An example of an active module that is capable of being calibrated in accordance with the present invention is shown in FIG. 1 and is represented generally by the numeral 12. The module 12 includes a plurality of antenna elements 14 that are controlled in either the transmit or receive mode. The module 12 includes a controller 16, a variable attenuator 18, a phase adjuster 20, an amplifier 22, a mixer 24, an attenuator 26, a band pass filter 28, a preamplifier 30, a 28 volt power amplifier 32, a 50 volt power amplifier 34, a limiter 36, a low noise amplifier 38, a circulator 40, and a regulator 42.

The controller 16 has an output 44 connected to control the condition of switches 46, 48, and 50 for switching between the transmit and the receive mode. Additionally, the controller 16 controls the on and off condition of the limiter or receiver protector 36, which is activated when the module 12 is in the transmit mode. The controller 16 has an output 52 that controls the bias to the preamplifier 30 for activating the power amplifiers 32 and 34 in the transmit mode. The regulator 42 controls the voltage to the preamplifier 30, and the power amplifiers 32 and 34, as well as the voltage to the low noise amplifier 38. The variable attenuator 18 is connected to an intermediate frequency source such as 370 megahertz, for example. The mixer 24 has an input connected to the local oscillator or Stalo having, for example, a 1585–1770 megahertz frequency. The controller 16 responds to signals at its input 54 for controlling the amplitude at attenuator 18 and the phase at the phase shifter 20 of the radiating elements during both the transmit and receive modes.

In the transmit mode, the switch 46 is in the condition where the amplifier 22 has its input connected to the attenuator 18 and the phase shifter 20. Switch 48 is in a condition so that the output of the amplifier 22 is connected over line 56 to an input of the mixer 24. The switch 50 is in a position to connect the output of the band pass filter 28 to the input of the antenna elements 14 via the preamplifier 30, and the power amplifiers 32 and 34 and the circulator 40.

In the receive mode, the switch 50 is in a condition to receive the signal through the limiter 36, the low noise amplifier 38 to the input of the band pass filter 28. Additionally, the switch 48 is in a position to connect the output signal from the mixer 24 to the input of the amplifier 22.

The output of amplifier 22 is connected through the switch 48 to the phase shifter 20 in variable attenuator 18. In accordance with the present invention, only one module of the array to be calibrated is activated at any one time.

Also, in accordance with the invention, the apparatus for calibrating a phased array antenna has a plurality of the active modules, such as described in connection with FIG. 1 and a test manifold comprising an RF antenna for positioning at a far field range from the antenna to be calibrated and a transceiver coupled to the far field antenna directly and through a path that includes the test manifold of the antenna to be calibrated. As herein embodied, and referring to FIG. 2, phased array antenna 14 includes active modules 12 coupled to the individual antenna elements and to the output of a local oscillator through a test manifold 60, an RF transmit manifold 62, and an IF receive manifold 64. The test manifold 60 is coupled to a transmit output 61, of each module 12.

Figure 2:
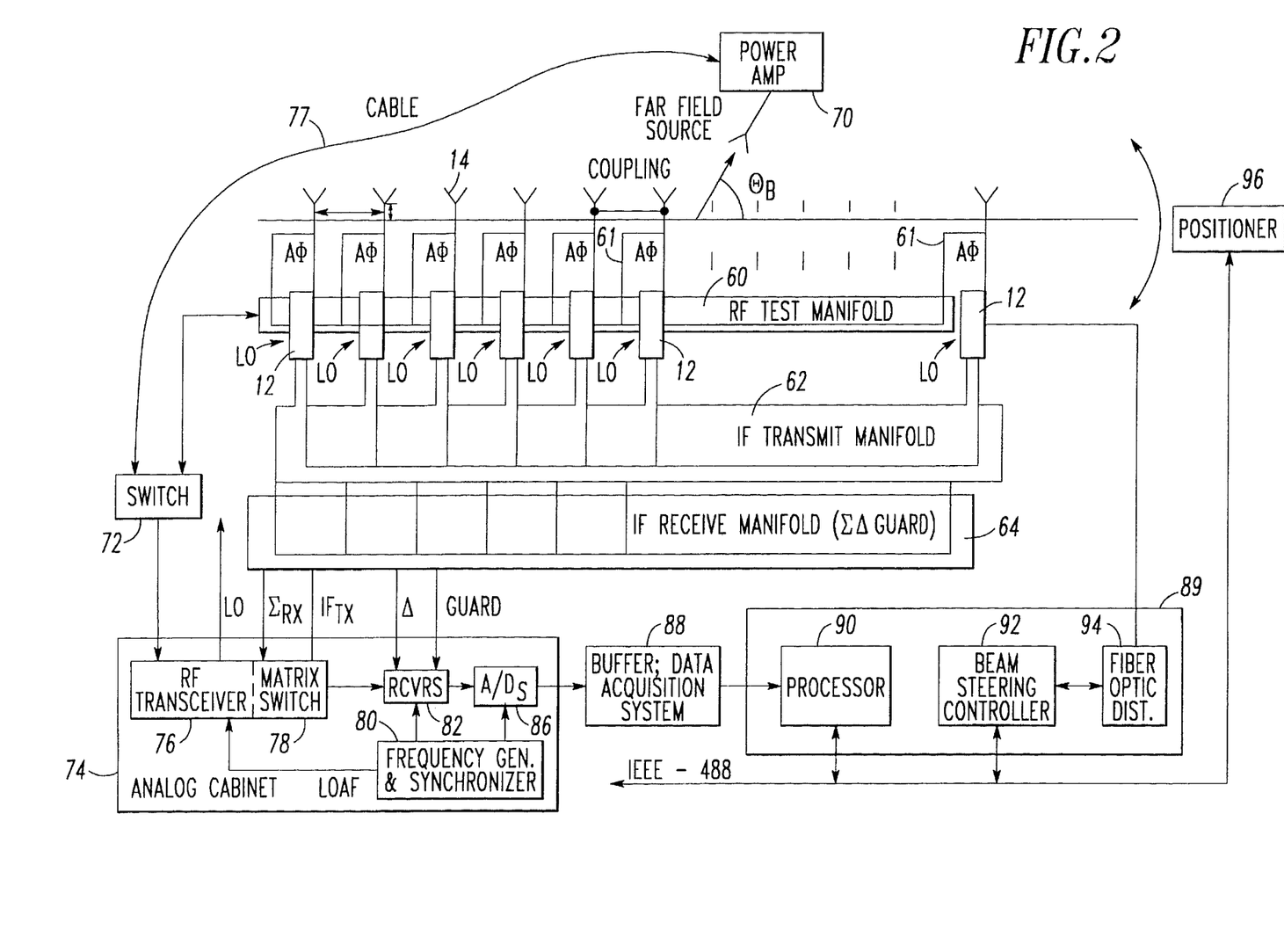
FIG. 2 is a schematic block diagram of a phased array antenna calibration system in accordance with the present invention.

A far field RF source antenna is positioned approximately 1700 feet from the array to be calibrated, and oriented so that the far field source and the array to be calibrated are on each other's boresight. The distance of the far field source from the array is selected so that the phase shift of the edge elements from element to element is less than the desired accuracy of the array. In other words, if the desired degree of accuracy is 0.01 of a degree error for each element, then the attempt would be to choose a distance such that the element to element phase shift for a signal on boresight would be less than 0.01 degrees.

The far field source 70, which may be a T/R antenna, is connected, preferably by a cable to a switch 72. The switch 72 is to collect data alternately from each one of the modules in sequence that is obtained in a path directly to or from the far field source 70 and a path to or from the test manifold 60. An analog portion or cabinet 74 includes an RF transceiver 76, a matrix switch 78, a frequency generator and synchronizer 80, and a receiver 82 for each one of the modules. The analog portion also includes A/Ds converters 86 for each of the modules. The apparatus has a digital portion 84 which includes a buffer or data acquisition system 88 connected to the output of the A/D converters 86, a signal processor 90 for processing the received data, a beam steering controller 92, and a fiber optic distribution system 94. The apparatus also includes a positioner 96 for orienting the array to be calibrated to various angular positions relative to the far field antenna.

Figure 3:
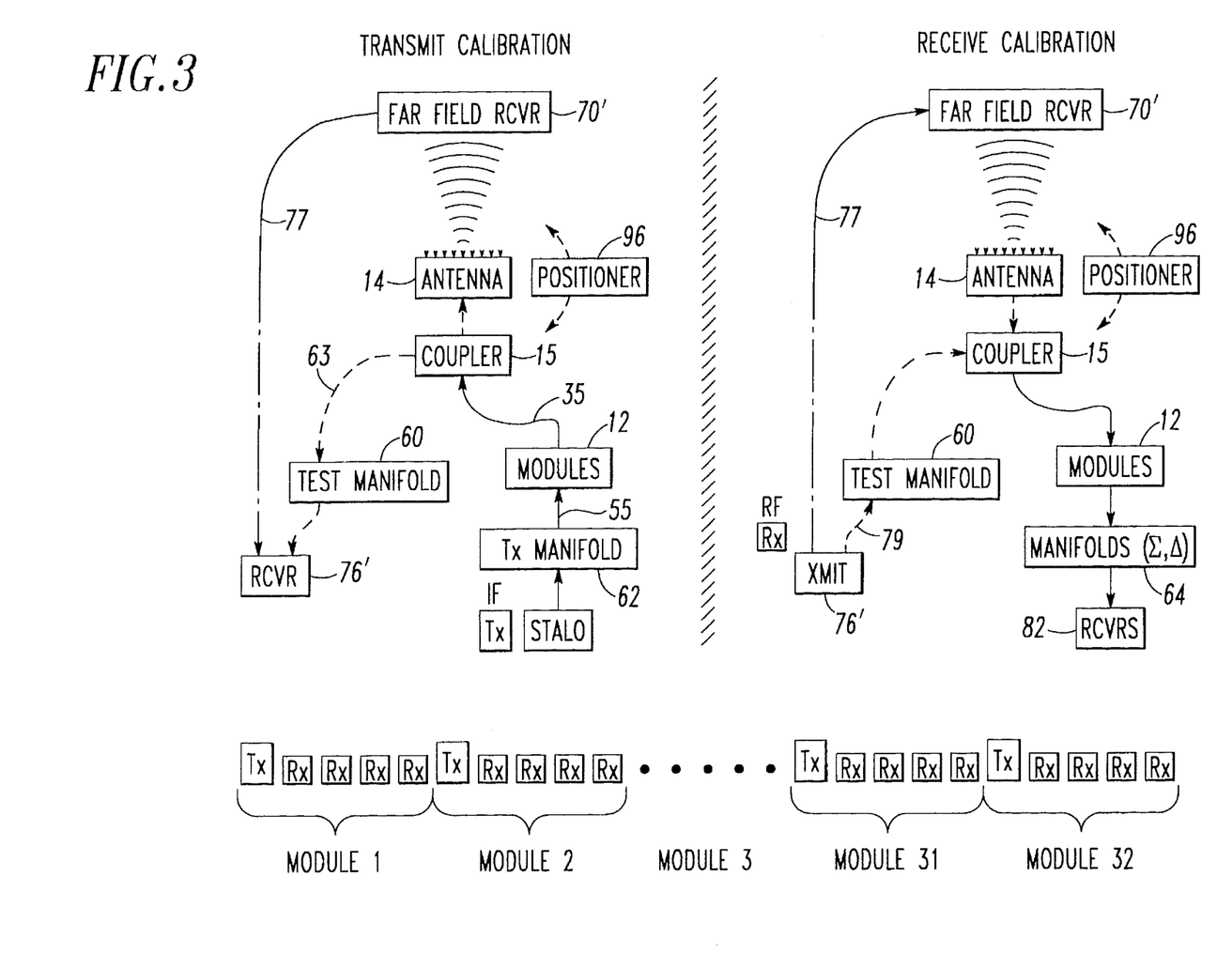
FIG. 3 is a diagram illustrating the signal flow for both the transmit calibration and the receive calibration in accordance with the present invention.

For a more detailed understanding of the paths taken by the radar pulses during the transmit calibration and the receive calibration for the phased array antenna, reference is made to FIG. 3. For calibrating in the transmit mode, the far field antenna becomes a receive antenna 70', the output of which is coupled directly to receiver portion 76' of the transceiver 76 (FIG. 2) by a cable 77. The antenna 14 to be calibrated which is oriented to radiate pulses to the far field 70' has an input connected to a coupler 15 that is coupled to the output of each of the modules 12. The transmit manifold 62 has its output 55 coupled to the input of the modules 12, and has an input for receiving radar pulses from the stabilized local oscillator Lo, which are generated by the frequency generator and synchronizer 80. Thus, the stable local oscillator pulses from 80 are transmitted to the transmit manifold 62, which in turn are transmitted over input 55 to an activated module 12 and to the coupler 15 and the antenna 14. At the coupler 15, the pulse from the module 12 is also injected into the test manifold 60 as indicated by dashed line 63 which in turn is coupled to the receiver 76' through the switch 72 (see FIG. 2). In the embodiment of FIG. 3, the array being calibrated is assumed to have 32 modules with four receive elements Rx and one transmit element Tx in each of the modules.

For calibrating in the receive mode, a far field source in the form of a transmit antenna 70" radiates pulses to the antenna 14. Transmitter 76" of the transceiver 76 is also connected, by cable 77 to the far field source 70" The transmitter 76" has an output indicated by dashed line 79 which is also injected into the test manifold 60 and into the coupler 15. As previously mentioned, the outputs of the transmitter 76" to the far field source 70" and the test manifold 60 occur alternately and not at the same time. The signals from the coupler 15 are then directed to module 12 and then to the receiver 82 for a particular module through the sum and difference manifolds 64. As will be described in more detail, the range calibration evaluates the difference between the signal from the test manifold and the far field source. The data for each of the modules in both the transmit and receive modes is collected at all positions of the phased array antenna 14. The modules are sampled pulse to pulse sequentially in time through only one receiver channel, which results in no channel imbalance. The pulse to pulse stability of the STALO allows for the collection of the module to module phase and amplitude differencers as if they were collected at the same time.

A more detailed description and method of the present invention will be described in describing the operation of the system in connection with FIGS. 4A and 4B through 8 herein. First, the transmit calibration method is described. In accordance with the present invention, the method of calibrating a phased array antenna for the transmit calibration comprises the steps of collecting, for each module of the array in sequence, first phase and amplitude data of radar pulses applied to a receiver from a far field source and collecting for each module of the array in sequence second phase and amplitude data of said radar pulses applied to a receiver from the transmit manifold. In collecting the data for the transmit calibration, the bias voltage of the preamplifier of all of the active modules is decreased to interrupt the power supply to the plurality of modules. Then, the bias voltage is increased and decreased for each power amplifier in sequence for each beam position of the antenna as controlled by the beam steering controller 92. The first phase and amplitude data is received externally from the far field source over the cable 77 and the second phase and amplitude data is received from the test manifold 60. The relative amplitude and phase or steering vector of each individual module is measured to establish a pattern for the array. The coherency is established by using the Stalo coherent pulses to measure each steering vector one element at a time. Measurement takes place externally through the far field source as indicated by matrices 102 and also through the test manifold by matrices 103. The amplitude and phase is stored for further processing in the buffer board or data acquisition system 88.

In accomplishing the receive calibration, the receiver protectors 36 of all of the modules 12 are initially placed in their "on" position to block signals of the radiating elements of the antenna being calibrated from reaching the receiver. Then, the receiver protectors for the individual modules of the antenna are turned "off" so that only one receiver module is "on" at any one time. For the receive calibration the data is collected through the receive manifold 64 for a signal transmitted externally over a cable, such as 77, to the far field source. Data is also collected through the receive manifold 69 for a signal injected from the transmitter into the test manifold 60. The data collected through the receive manifold from the external source for each of the modules and for each beam position is shown by matrices 104 of FIG. 4B and the data collected through the receive manifold from the test manifold for each of the modules and for each beam position is indicated by matrices 105. Similar to the transmit calibration, the coherent steering vector is obtained for each of the modules and the coherency is obtained by utilizing the STALO coherent pulses for calibration. The relative phase and amplitudes of the individual modules are also stored in the buffer or data acquisition system 88 similar to the data collected for the transmit calibration.

Figure 4A:
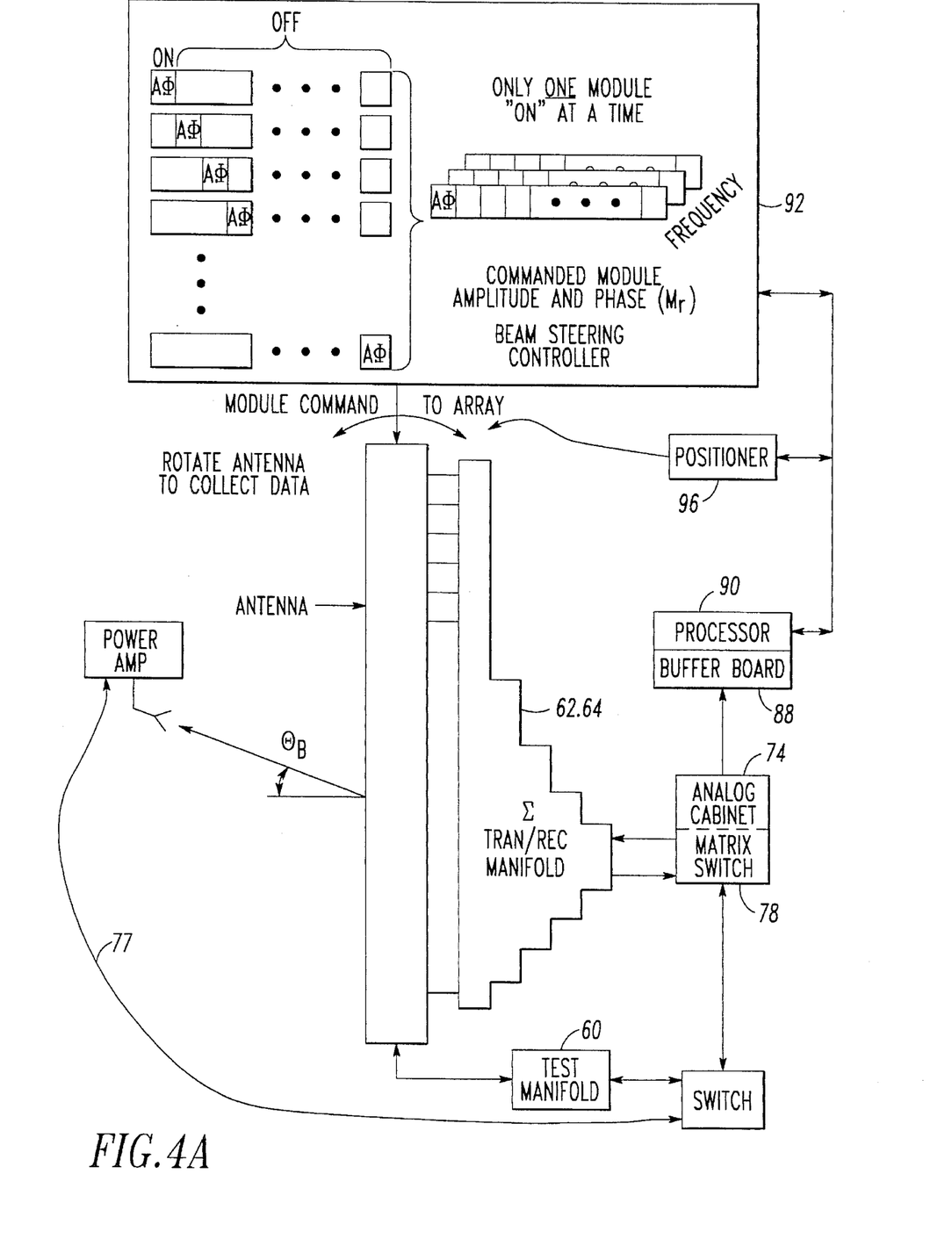
FIG. 4A is a diagram illustrating the data collection stage of the process for both the transmit and receive calibration.
Figure 4B:
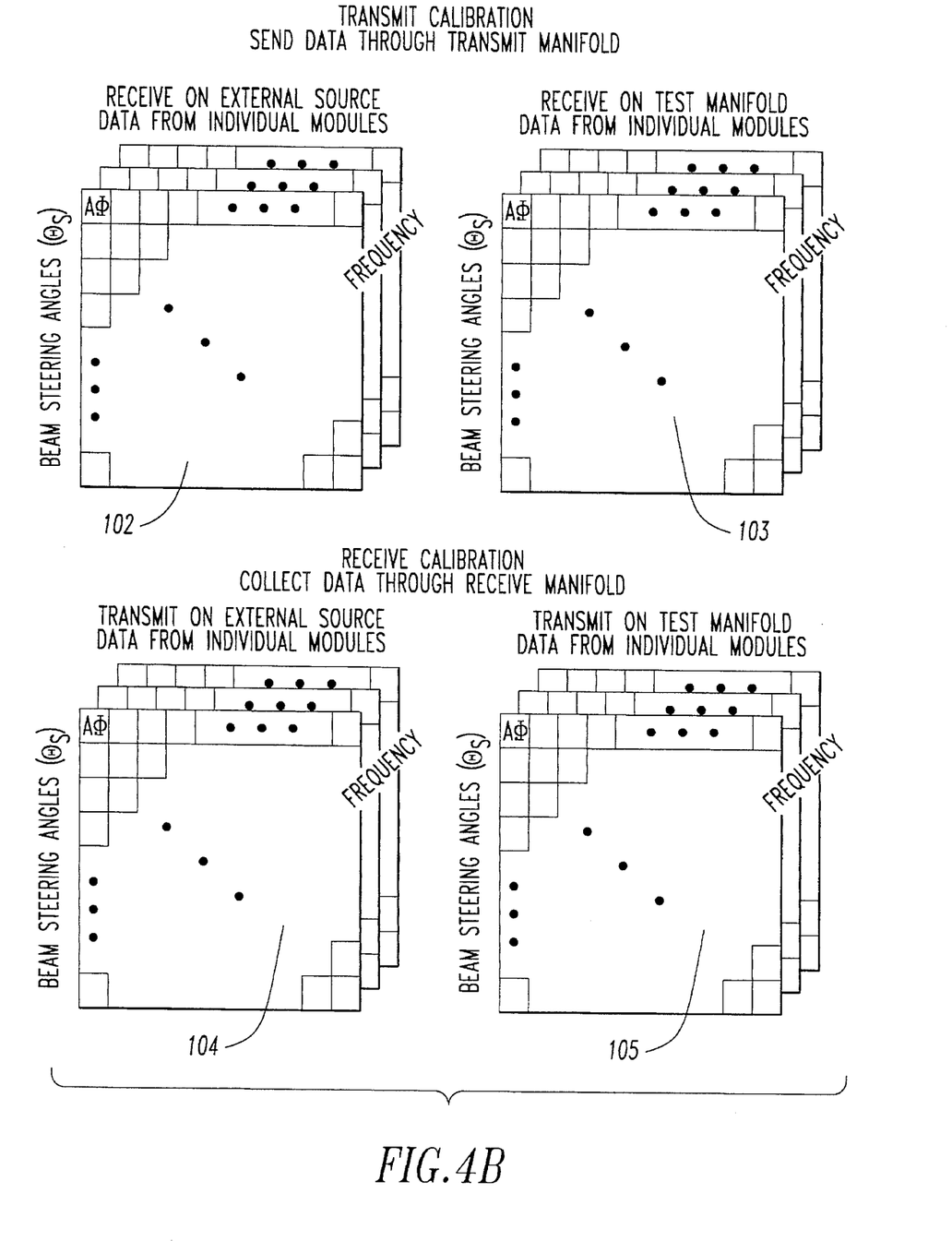
FIG. 4B illustrates the stored data for the transmit and receive calibration of FIG. 4A.

The system alternately collects data from the test manifold and external source for each beam position $\theta^B$. a different set of matrices 102, 103, 104, and 105, are collected for each frequency over which the array is calibrated. The data collected by the test manifold should not change with beam position $\theta_B$ unless the modules drift while the data is being collected.

Figure 5A:
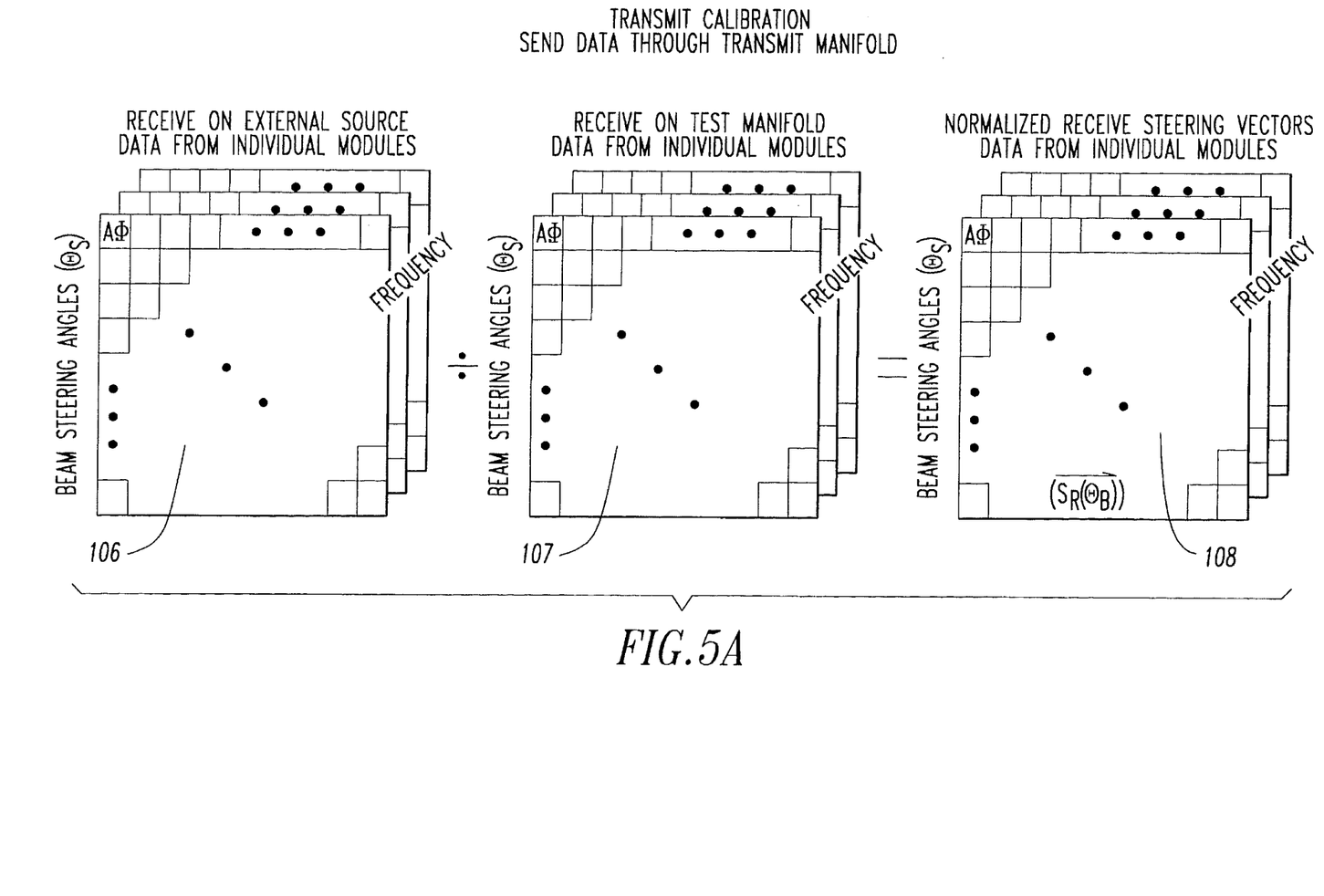
FIG. 5A and 5B are diagrams of the data normalization portion of the process for the transmit are receive calibration, respectively.
Figure 5B:
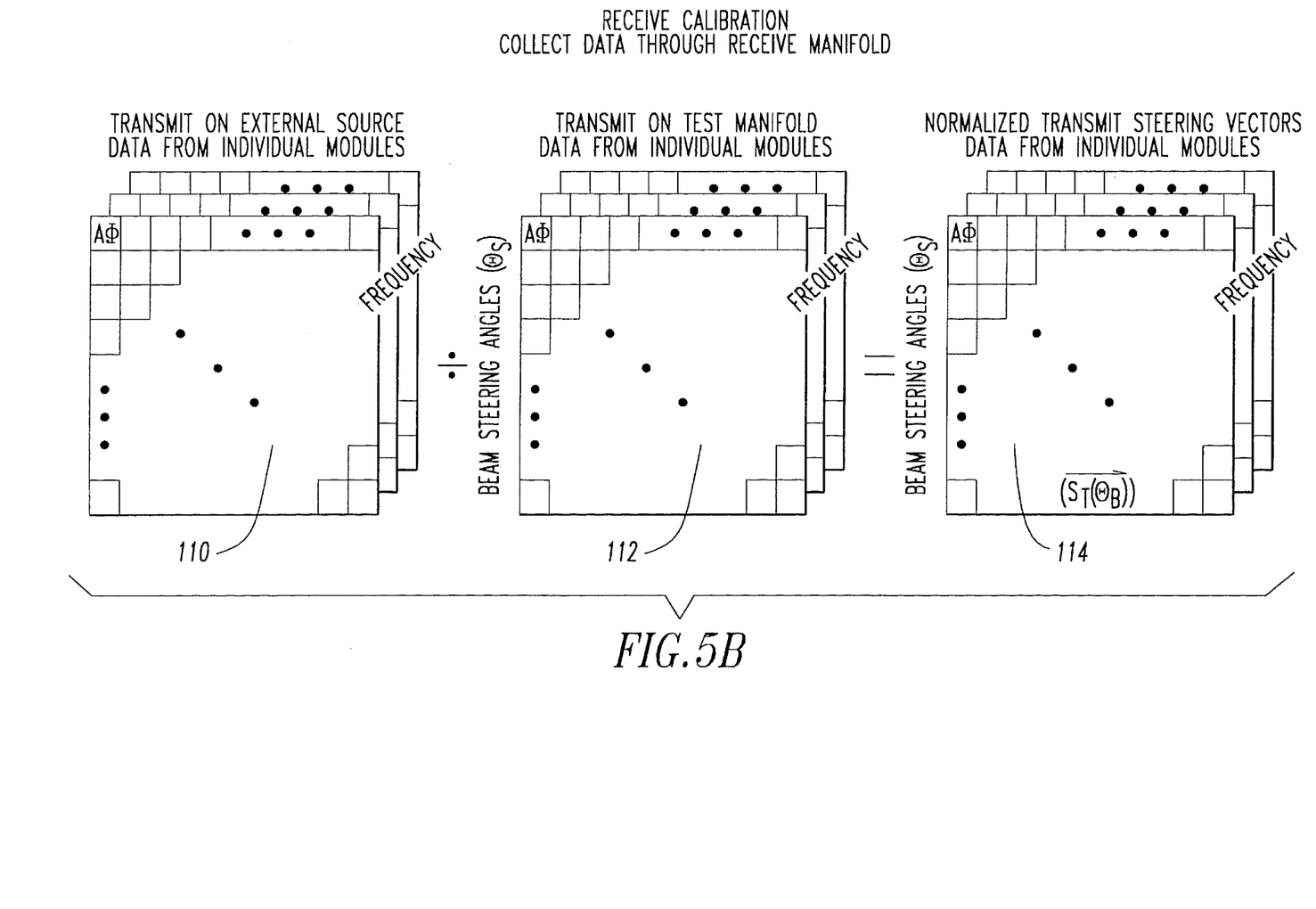

Referring to FIGS. 5A and 5B, the data that is stored in the buffer or acquisition system 88 is normalized. For the transmit calibration, as shown in FIG. 5A, the data that was transmitted through the transmit manifold 62 and received externally over cable 77 is divided by the data that was received on the test manifold for each of the individual modules to equal the normalized receive steering vectors for each of the modules. The steering vectors represented by matrices 106 are divided by the steering vectors from the test manifolds represented by the matrices 107 to obtain the normalized receive steering vectors at the matrices 108. The rows in the resultant matrix 108 become sets of steering vectors in all of the $\theta^B$ beam steering angle directions. As shown in FIG. 5B for the receive calibration, the data which is collected through the receive manifold 64 and transmitted on the external source as indicated by the matrices 110 are divided by the data transmitted on the test manifold 66 as indicated by the matrices 112 to equal the normalized transmit steering vectors. Similarly to the transmit calibration, the rows in the resulting matrix become sets of steering vectors in all steering angle $\theta_B$ directions. The data in the matrices becomes insensitive to the modules providing that the modules do not change between test manifold and external source data collection.

Figure 6:
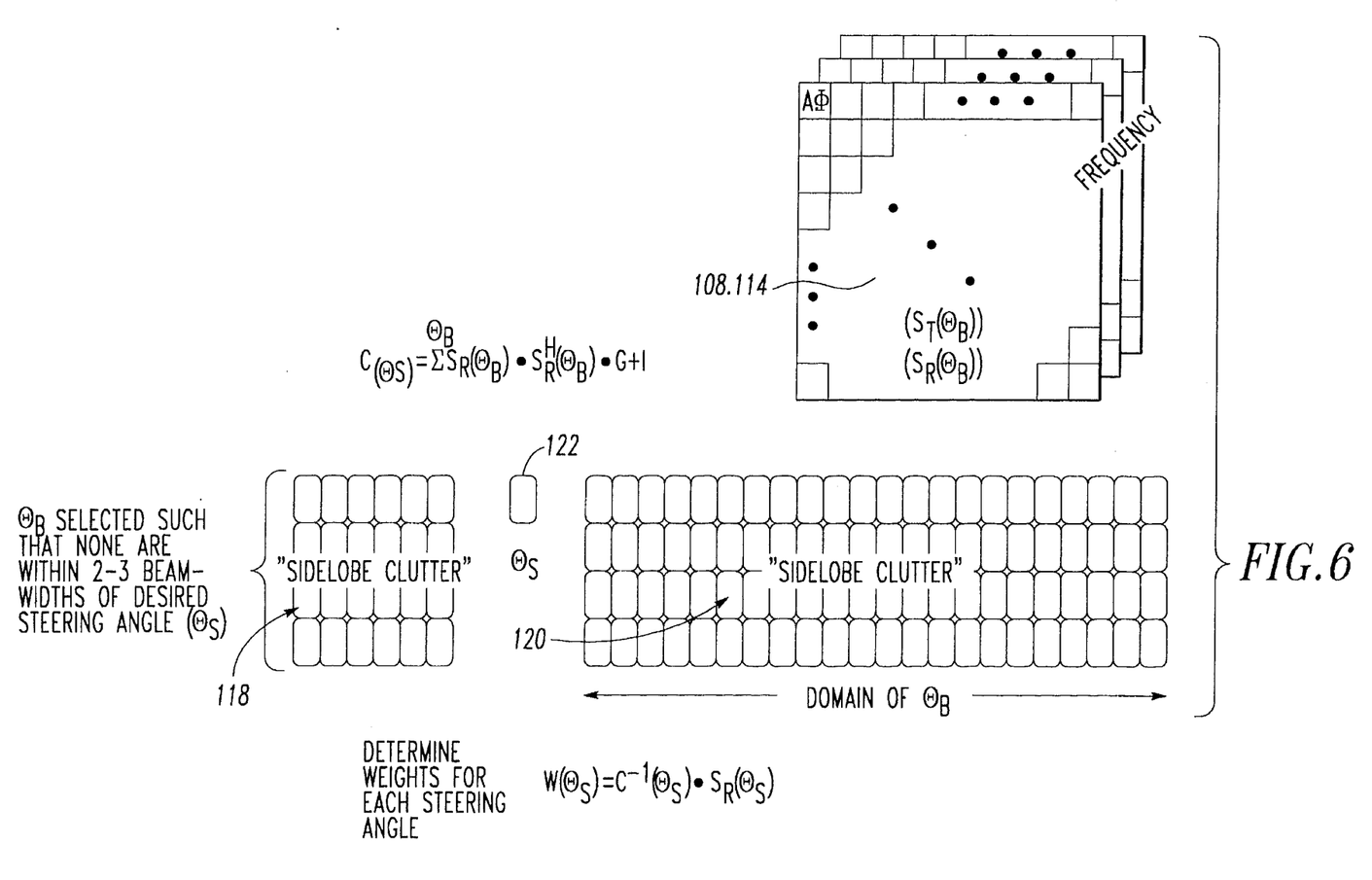
FIG. 6 is a diagram illustrating the determination of weights for each steering angle for sequential adaptive processing of the present invention.

Referring to FIG. 6, each of the normalized steering vectors in the receive matrices 108 $S_R$ and the transmit matrices 114 $S_T$ of FIG. 6 are multiplied by the conjugate transpose co-variance matrix $\theta_B$ to obtain the desired weights. The steering vector data may be used to fill co-variance matrices $[C(\theta_S)]$ with "sidelobe clutter" at appropriate angles for each steering angle $\theta_S$. The steering angles need only be a subset of the collected data, and only twelve angles, for example, are required to cover a 120° scan. Fourteen steering angles would cover beyond 120° scan, and sixteen steering angles could cover 180°. The co-variance matrices for receive are obtained in accordance with the following formula.

$$C(\theta_S) = \Sigma^{\theta_B} S_R(\theta_B) \cdot S_R^H(\theta_B) \cdot G + I$$

where $S_R$ is the steering vector for receive and $S_H$ is its conjugate transpose. Each of the co-variance matrices $C(\theta_S)$ is a 32 by 32 Hermitian Matrix given thirty-two modules. As shown in FIG. 6, the domain of $\theta_B$ is chosen such that none of the steering vectors $S_R(\theta_B)$ is closer than two or three beam widths of the desired steering direction $\theta_S$. These steering vectors could represent energy coming from sidelobe clutter 118 and 120 on either side of the desired steering direction. The value G is chosen empirically to control the sidelobe clutter magnitude and the identity matrix I, represents the noise level of the modules. The transmit calibration is accomplished by substituting the steering vectors for transmit, $S_T(\theta)$, for the receive steering vectors, $S_R(\theta)$, and computing the co-variance matrices and weight vectors as described in the previous paragraph and as shown in FIG. 6.

Figure 9:
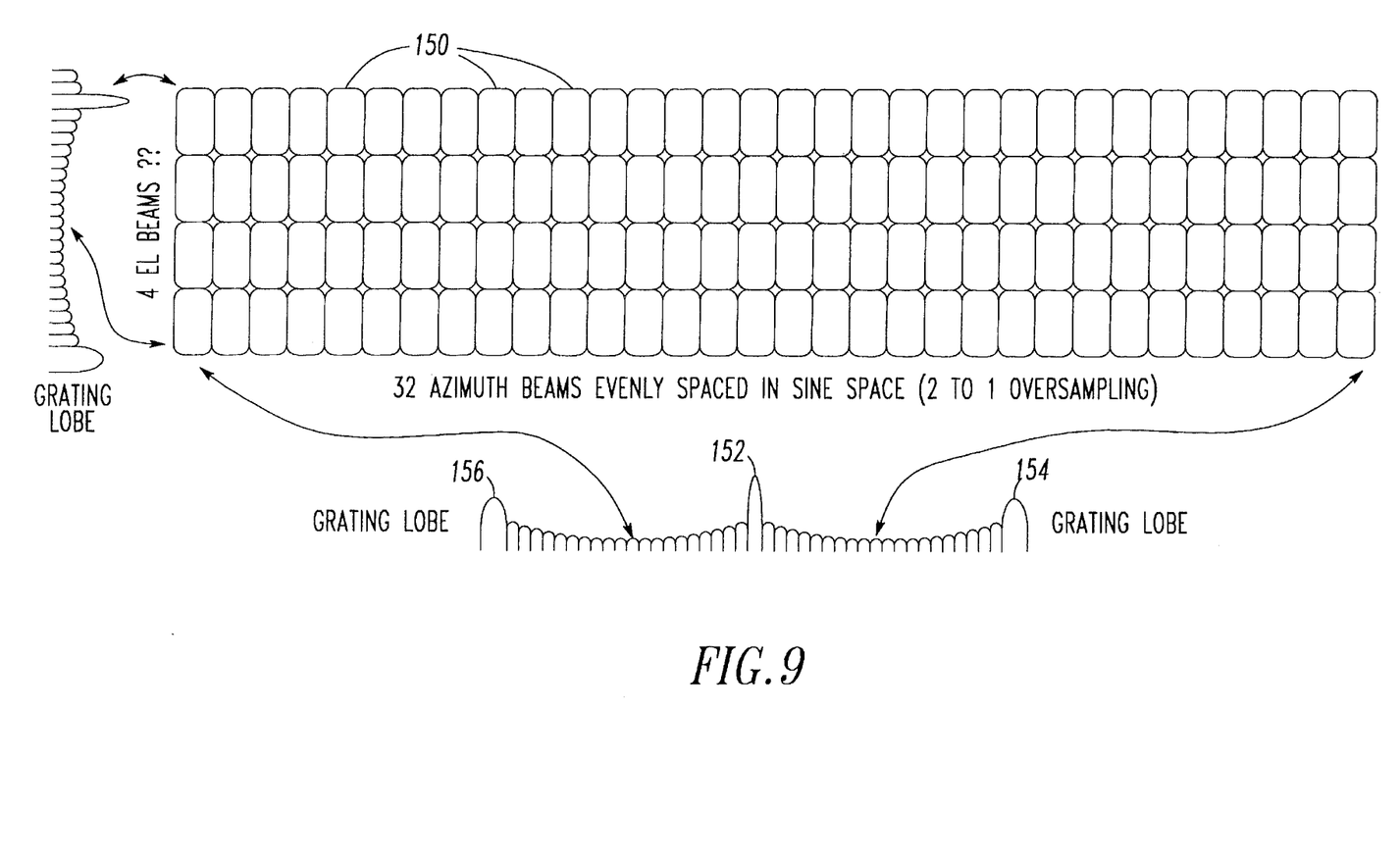
FIG. 9 is a diagram of the calibration of beam space, and depicts the angular beam positions for which data is collected and over which the array will be calibrated in accordance with the present invention.

FIG. 9 represents the complete beam space 150 of the calibration data collection. The domain of $\theta_B$ as shown in FIG. 6 is a subset of this beam space. The data must be collected from beams which are evenly spaced in Sine space and which are at least two to one over-sampled. For a 16 element array in azimuth two to one over-sampling would require 32 azimuth beams. The angular extent must cover ½ the distance to the array's first grating lobe 156 and 154 for a natural boresight beam 152. The diagram also illustrates the elevation beam positions assuming the array has only two elevation degrees of freedom.

The commands for each of the modules, that is the phase and amplitude commands are obtained by multiplying the weight vector by the commanded amplitude and phase of each module to obtain the module command for each steering angle.

Figure 7:
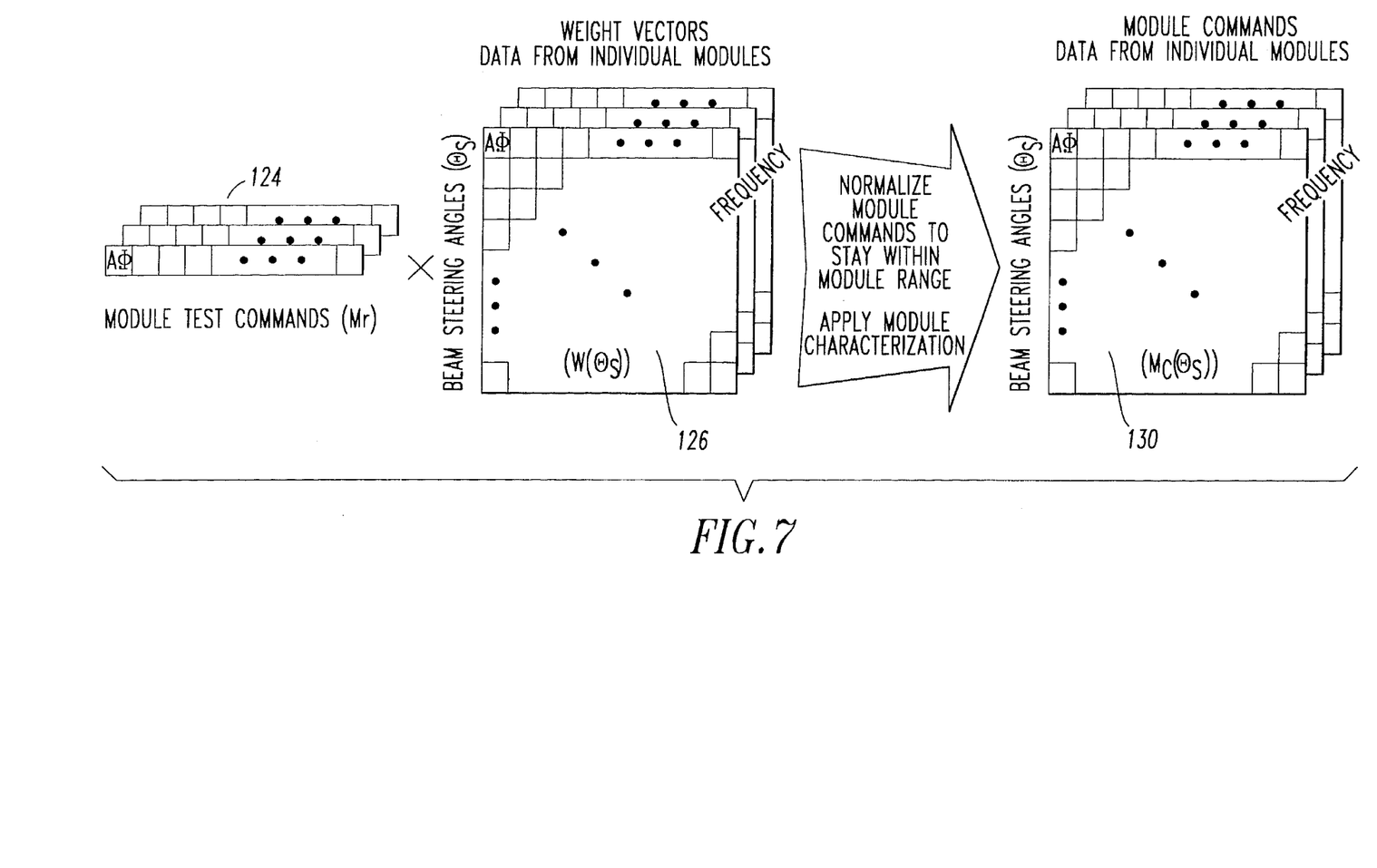
FIG. 7 is a diagram to illustrate use of weight vectors and the test commands to determine the approximate calibrated module commands in accordance with a second portion of sequential adaptive processing steps of the present invention.

As shown in FIG. 7, the module test commands represented by rows 124 multiplied by the weight vectors $W(\theta_S)$ as previously described and as indicated by the matrices 126 equal the module commands that have been calibrated as previously described, which are represented by matrices 130.

Figure 8A:
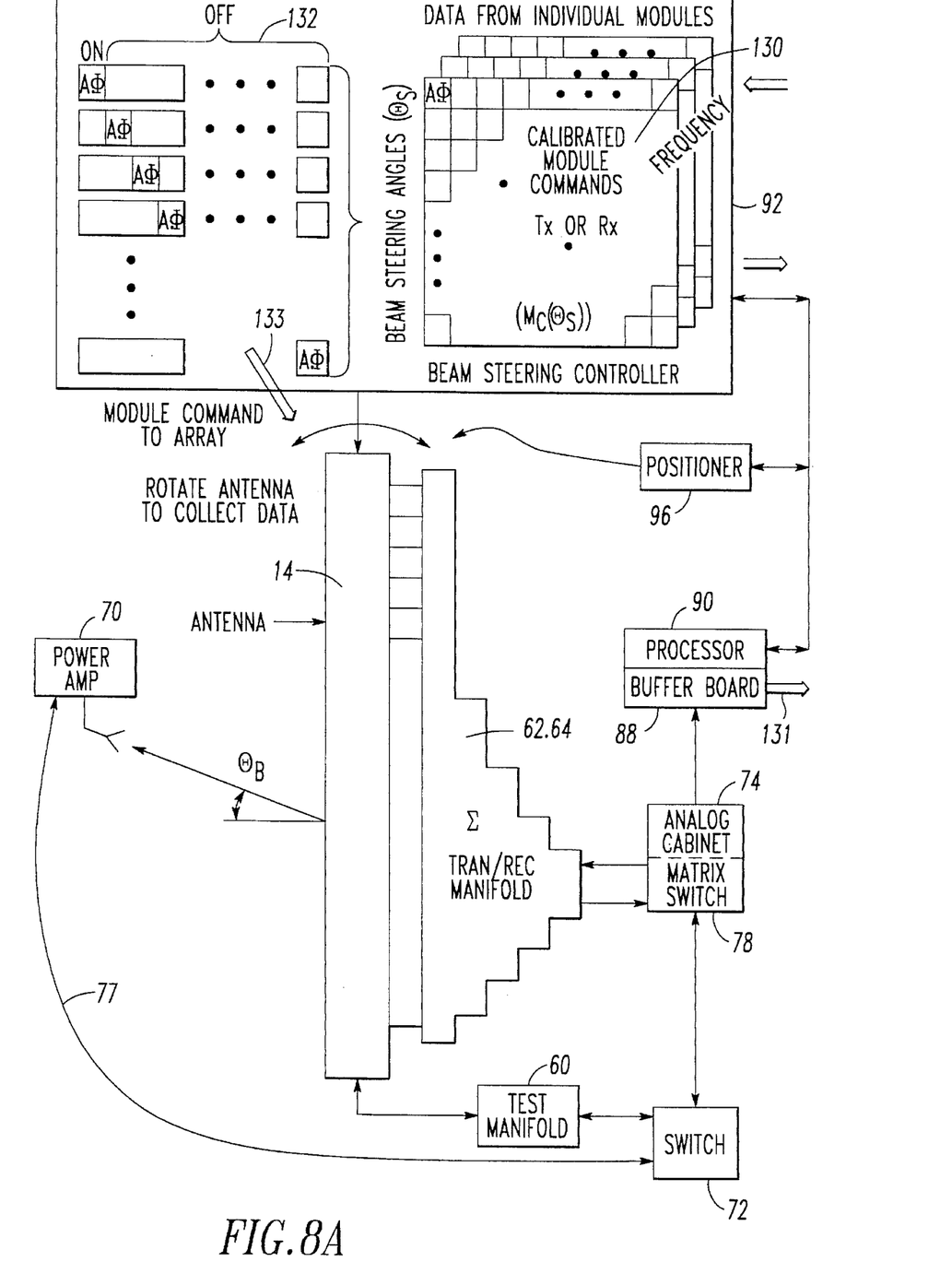
FIGS. 8A and 8B when placed side by side form a schematic diagram illustrating the application of commands to the array, the injection of the signal into the test manifold and the iterative processing of the signals to adjust the module commands to produce the exact weights as determined in FIG. 6A in accordance with the present invention.

In accordance with the invention, the array may be calibrated at a particular range or in-flight, as shown in FIG. 8A. The module commands for each steering angle, which are obtained by multiplying the weight vector by the commanded amplitude and phase of each module are applied to the array 14 as indicated by arrow 133 by the sequence of module commands 132 from the calibrated commands as indicated by matrix 130. The relative phase and amplitude signal of each module is then measured via the test manifold 60 and either the transmit or receive manifold 62 and 64.

Figure 8B:
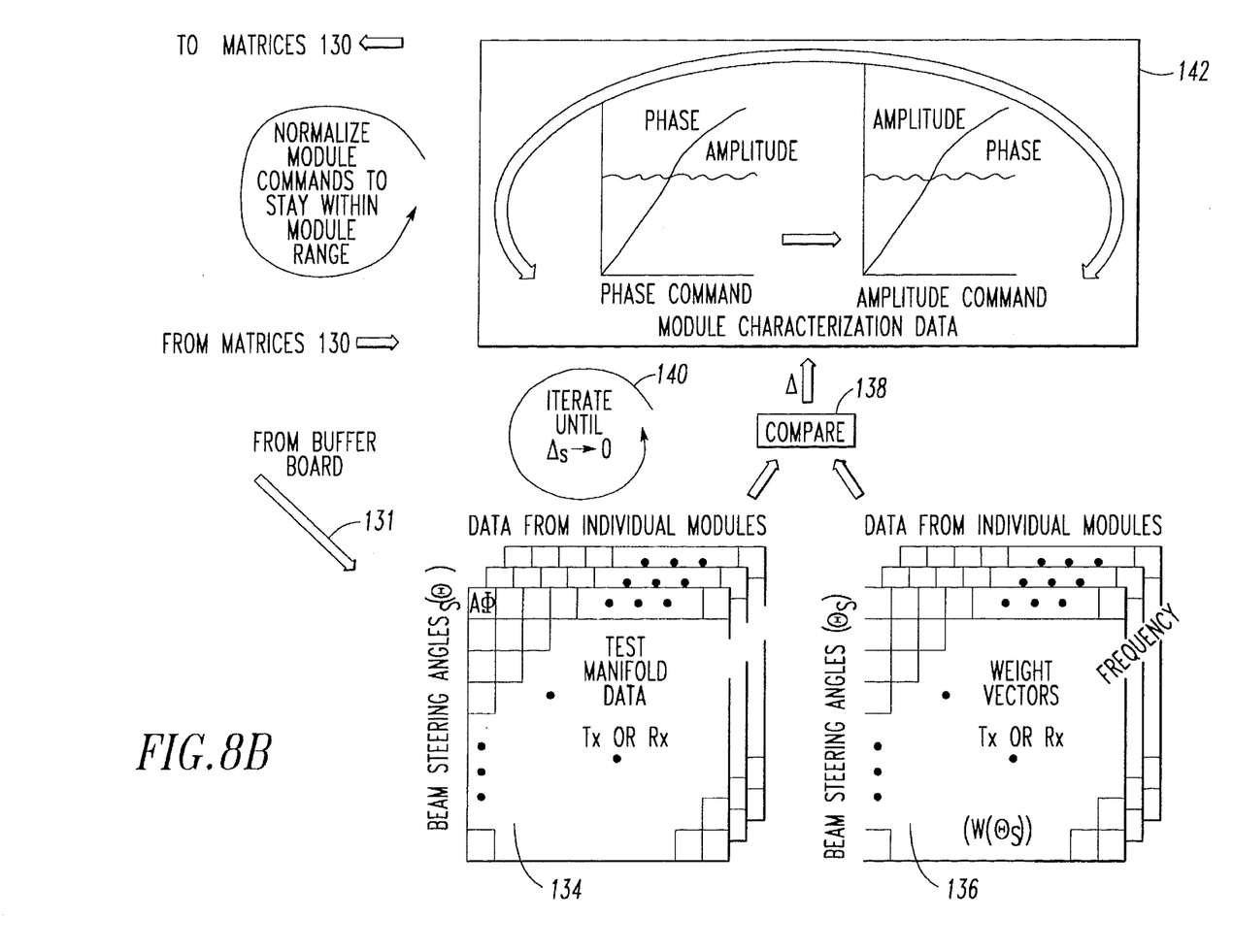

The transmit module data is read from the test manifold and the received module data is read from the Σ sum manifold as shown by arrow 131 of FIG. 8B and indicated at matrices 134. The weight vectors as shown by matrix 136 can be recalculated for any desired pattern and any number of module failures.

The output 134 of the test manifold 60 is compared with the desired weight as shown by matrix 136 at block 138 to obtain an error signal for a particular module. The error signal s is applied to the command signal until the error signal is minimized as shown at 140 of FIG. 8B. The module commands are amplitude and phase normalized to stay within the module range as indicated by schematic illustration at 142.

In summary there has been described a method, Sequential Adaptive Deterministic Calibration of Active Phased Arrays (SADCAPA), to calibrate active phased arrays using adaptive processing techniques without the need to have a receiver channel for each active module in the array. Therefore, the array can use conventional manifolding of all the modules into a single receiver channel. The individual modules are calibrated by using the pulse to pulse stability and/or CW stability of an external and/or internal source. The modules are polled (on/off) pulse to pulse and the resultant data is treated as if it were collected from all modules at the same time through separate receiver paths. By using only one receiver channel, a second source of error (channel matching) inherent in conventional adaptive processing is removed. Calibration is then accomplished using adaptive processing techniques to optimize the antenna pattern. Data is collected from both a far field range and a self-contained signal injection port. The self-contained signal can then be used to re-calibrate the array for module drifts after the initial far field calibration.

The test signal is injected for receive calibration or measured for transmit calibration at the receive input (also the transmit output) of the modules. The test signal path is made common to both transmit and receive chains, so that the same data used to calibrate the array on receive can be used be used to calibrate the antenna on transmit even when separate transmit and receive paths and separate phase and amplitude controllers are used in the modules.

A test manifold which is coupled in at the transmit output of each module is used. This location enables the re-tuning of the array for module drift but cannot recalibrate the radiators which are beyond the coupler. The assumption is that the radiators, once calibrated, remain static. Alternately, an external source/receiver beyond the radiators could be used to recalibrate for such effects as array bending or warpage after the initial range calibration.

The test signal and the radiating elements may be calibrated either on the ground or in flight with a know far-field source. Data is collected with the external source in all possible beamspace positions. Data is collected with beamspace intervals of less than or equal to ½ the nominal 3 dB beamwidth of the antenna. This data forms the basis for all subsequent calibration of the array. This data is used to define external interference signals whose placement and distribution defines the environment to which the array is adapted to. The pattern is formed using optimal adaptive processing techniques although the pattern is deterministic in that the operator defines the environment to adapt to instead of having the array adapt to the actual environment.

Once an optimal set of weights for the defined environment is determined, the embedded test signal is used to set each module to the appropriate phase and amplitude setting. Thereafter, the array is continually recalibrated using the embedded test signal to prevent module drift from de-tuning the array.

This calibration method described can not only calibrate the antenna to produce a low sidelobe pattern, but can arbitrarily calibrate the antenna to produce any desired sidelobe pattern within the tuning limits of the modules. Therefore, a pattern could be formed to null any particular sidelobe region or regions which are interfering with the radar such as in jamming or in localized sidelobe clutter. In contrast to fully adaptive system which can form multiple receive patterns at the same time, this system is directed to a single transmit and a single receive pattern during any instant of time. However, separate transmit and/or receive patterns can be formed pulse to pulse which could have advantages in certain applications. This calibration method is capable of recalibrating the array not only for module drift and degradation but for complete module failure. An optimal pattern can be recalculated and produced no matter which module fails.

I claim:

1. A method of calibrating a phased array antenna having a plurality of active modules, and a test manifold, comprising the steps of:

collecting, for each module of the array in sequence, first phase and amplitude data of radar pulses applied to a receiver from a far field range;

collecting, for each module of the array in sequence, second phase and amplitude data of said radar pulses applied to a receiver from the test manifold;

determining a command phase and amplitude for each steering angle of each module;

comparing the phase and amplitude data from the test manifold with the phase and amplitude data from the far field range to obtain an error signal; and combining the error signal with the command amplitude and phase iteratively until the error signal is minimized.

2. The method of claim 1 wherein the step of collecting the first phase and amplitude data, comprises the substeps of:

decreasing a bias voltage of each power amplifier in all of the active modules to interrupt a power supply to the plurality of modules;

increasing and decreasing the bias voltage of each power amplifier in sequence for transmit mode calibration;

forming the radar pulses at a Stalo of a transmitter to which the antenna being calibrated is coupled; and radiating the pulses from the antenna being calibrated to the far field range for transmitting from the far field range to the receiver.

3. The method of claim 1 wherein the step of collecting the second phase and amplitude data, comprises the substeps of decreasing a bias voltage of each power amplifier in all the active modules to interrupt a power supply to the plurality of modules;

increasing and decreasing the bias voltage of each power amplifier in sequence for transmit mode calibration;

forming the radar pulses at a Stalo of a transmitter to which the test manifold of the antenna being calibrated is coupled; and injecting the Stalo formed pulses into the receiver via the test manifold.

4. The method of claim 1 wherein the step of collecting the first phase and amplitude data, comprises the substeps of:

turning on the receiver protectors of all the modules of the array;

turning off and on the receiver protector for each module in sequence for receive mode calibration;

communicating the radar pulses to activate a far field source at the far field range for radiation to the antenna being calibrated; and receiving the radar pulses via each of the modules of said antenna at times when the receiver protector is off.

5. The method of claim 1 wherein the step of collecting the second phase and amplitude data, comprises the substeps of:

turning on the receiver protectors of all the modules of the array;

turning off and on the receiver protector for each module in sequence for receive mode calibration;

injecting the radar pulses into the test manifold; and receiving the injected pulses via the test manifold and each of the modules in sequence at times when the receiver protector is off.

6. A method of calibrating a phased array antenna having a plurality of active modules, and transmit, receive, and test manifolds, comprising the steps of:

positioning the boresight of the array to be calibrated on a far field receiver/source of radiant energy;

measuring a coherent steering vector of each individual module of the array in sequence both through a first path including the test manifold and a second path including the receive manifold;

storing the measured amplitude and phase of each module for both the first and second paths;

normalizing the stored data by dividing the steering vector of the second path by the steering vector of the first path;

multiplying each normalized steering vector by conjugate transpose co-variance matrix to obtain corresponding weight vectors;

determining a command amplitude and phase of each module;

multiplying the weight vectors of each element by the commanded amplitude and phase of each module to obtain a weighted module command for each steering angle of the modules;

adjusting the phase and amplitude of each module of the array in accordance with the weighted module command;

injecting the weighted module command into the test manifold;

measuring the output amplitude and phase of the injected module command;

comparing the measured output of the test manifold with the weighted module command to obtain an error signal for each module; and combining the error signal with the weighted module command until the error signal is minimized.

7. The method of claim 6 wherein the step of measuring the coherent steering vector comprises the substep of:

using coherent pulses of a Stalo to activate each module in sequence.

8. The method of claim 6 wherein the step of measuring the coherent steering vector, comprises the substeps of:

turning on a receiver protector for all receiving modules of the array, and turning off and on the receiver protector for each module of the array in sequence.

9. The method of claim 6 wherein the step of measuring the coherent steering vector, comprises the substep of:

reducing a biasing voltage to all power amplifiers of the modules, and increasing and decreasing the biasing voltage of each module of the array in sequence.

10. An apparatus for calibrating a phased array antenna having a plurality of active modules and a test manifold, comprising:

an RF antenna for positioning at a far field range from the antenna to be calibrated;

a receiver having an input coupled to a far field source and the test manifold;

a transmitter having an output coupled to the test manifold and to the modules of the antenna being calibrated for radiating RF energy to the far field range means for determining a command phase and amplitude for each steering angle of each module of the antenna being calibrated;

means for comparing the phase and amplitude data from the test manifold with the phase and amplitude data of the far field range to obtain an error signal; and means for combining the error signal with the command amplitude and phase iteratively until the error signal is minimized for each module of the antenna.

11. The apparatus of claim 10, wherein the receiver has an input coupled to receive radar pulses from the far field source via the antenna being calibrated and radar pulses from the test manifold; and wherein the transmitter has an output coupled to apply the radar pulses to the far field source and the test manifold.

12. The apparatus of claim 10 wherein the receiver has an input coupled to receive radar pulses returned via a far field receiver at the far field range and coupled to receive radar pulses from the test manifold; and wherein the transmitter includes a Stalo coupled to generate the radar pulses, said transmitter being coupled to transmit the radar pulses to the far field receiver via the antenna being calibrated and coupled to inject the Stalo generated pulses into the test manifold.

13. An apparatus for calibrating a phased array antenna having a plurality of active modules and a test manifold, comprising a receiver and a source of RF energy for placing at a far field location on the boresight of the antenna to be calibrated;

a receiver having an input connected to the far field receiver and the test manifold;

a transmitter having an output for connection to the modules of the antenna being calibrated via a transmit manifold;

a processor including a buffer coupled to the receiver for measuring and storing a coherent steering vector of each individual module of the array in sequence received both through a first path including the test manifold and a second path including the far field receiver, the processor including means for normalizing the stored data by dividing the steering vector of the second path by the steering vector of the first path, means for multiplying each normalized steering vector by a conjugate transpose co-variance matrix to obtain corresponding weight vectors, means for determining a command amplitude and phase for each module, means for multiplying the weight vectors of each module by the commanded amplitude and phase of each module to obtain a weighted module command for each steering angle of the modules;

means for adjust the phase and amplitude of each module of the array in accordance with the weighted module command, means for injecting the weighted module command into the test manifold, means for measuring the output amplitude and phase of the injected module command;

means for comparing the measured output of the test manifold with the weighted module command to obtain an error signal for each module; and means for combining the error signal with the weighted module command iteratively until the error signal is minimized.

14. The apparatus of claim 13 wherein the transmitter includes a Stalo to activate one module of the array at a time.

15. An apparatus for calibrating a phased array antenna having a plurality of active modules and a test manifold, comprising a source of RF energy for placing at a far field location on the boresight of the antenna to be calibrated;

a transmitter having an output for connection to the far field source for transmitting radar pulses to the antenna and connected to the test manifold, a receiver having an input connected to the antenna via the sum and difference manifold to receive radar pulses from the test manifold and return pulses from the far field source;

a processor including a buffer coupled to the receiver for measuring and storing a coherent steering vector of each individual module of the array in sequence received both through a first path including the test manifold and a second path including the far field receiver, the processor including means for normalizing the stored data by dividing the steering vector of the second path by the steering vector of the first path, means for multiplying each normalized steering vector by a conjugate transpose co-variance matrix to obtain corresponding weight vectors, means for determining a command amplitude and phase for each module, means for multiplying the weight vectors of each module by the commanded amplitude and phase of each module to obtain a weighted module command for each steering angle of the modules;

means for adjust the phase and amplitude of each module of the array in accordance with the weighted module command, means for injecting the weighted module command into the test manifold, means for measuring the output amplitude and phase of the injected module command;

means for comparing the measured output of the test manifold with the weighted module command to obtain an error signal for each module; and means for combining the error signal with the weighted module command iteratively until the error signal is minimized.

* * * * *